United States Patent
Cao et al.

(10) Patent No.: US 7,023,935 B2
(45) Date of Patent: Apr. 4, 2006

(54) TRELLIS BASED MAXIMUM LIKELIHOOD SIGNAL ESTIMATION METHOD AND APPARATUS FOR BLIND JOINT CHANNEL ESTIMATION AND SIGNAL DETECTION

(75) Inventors: Lei Cao, Piscataway, NJ (US); Jinyun Zhang, New Providence, NJ (US); Phillip Orlik, Scotch Plains, NJ (US); Daqing Gu, Morris Plains, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 865 days.

(21) Appl. No.: 09/994,540

(22) Filed: Nov. 27, 2001

(65) Prior Publication Data

US 2003/0099308 A1      May 29, 2003

(51) Int. Cl.
*H04L 27/06*       (2006.01)
(52) U.S. Cl. ........................ 375/341; 375/262
(58) Field of Classification Search ............... 375/340, 375/341, 262; 714/795
See application file for complete search history.

(56) References Cited

U.S. PATENT DOCUMENTS

| | | | |
|---|---|---|---|
| 5,263,033 A | 11/1993 | Seshadri | 371/43 |
| 5,325,402 A | 6/1994 | Ushirokawa | 375/94 |
| 5,432,818 A | 7/1995 | Lou | 375/324 |
| 5,432,821 A * | 7/1995 | Polydoros et al. | 375/340 |
| 5,872,816 A * | 2/1999 | Parr et al. | 375/341 |
| 6,134,277 A | 10/2000 | Shah | 375/341 |

\* cited by examiner

*Primary Examiner*—Jay K. Patel
*Assistant Examiner*—David B. Lugo
(74) *Attorney, Agent, or Firm*—Dirk Brinkman; Andrew J. Curtin

(57) ABSTRACT

A method and system performs blind joint channel estimation and signal detection in a communication system that includes multiple channels for transmitting symbols. The multiple channels are estimated using a small number of symbols initially received through the multiple channels. When the channels have been estimated, a single best channel is selected. From then on, the bulk of the symbols are detected only on the best channel, while the best channel is updated.

15 Claims, 4 Drawing Sheets

TRELLIS BASED MAXIMUM LIKELIHOOD SIGNAL ESTIMATION METHOD AND APPARATUS FOR BLIND JOINT CHANNEL ESTIMATION AND SIGNAL DETECTION

FIELD OF THE INVENTION

The invention relates generally to communication systems, and more particularly to estimating wireless communication channels subject to multi-access interference, multipath fading, varying power levels and noise in order to detect signals transmitted through the channels.

BACKGROUND OF THE INVENTION

There are a number of problems with communication systems. A major challenge in signal recovery in mobile communications is to recover symbols from a signal transmitted over multiple channels in the presence of channel fading and distortion. In many communication systems, receivers observe the sum of multiple transmitted signals due to multi-paths, plus any noise. In addition, as a mobile transmitter proceeds along its route, the communication environment is constantly changing. That results in received signals that are displaced with respect to time, space, and frequency. Therefore, many wireless communication systems operate under highly dynamic conditions due to the mobility of the transceivers, varying environmental conditions, and the random nature of channel access. Equalization of multipath channels and detecting signals in receivers poses many difficulties.

In wireless communication systems, mobile transmitters send symbols at a high data rate. Multiple copies of the signal, with delays, can interfere with the main signal. This is referred to as "delay spread," and causes inter-symbol interference (ISI). As a result, equalizers may be required. Equalization with training sequences is widely used in many communication systems. However, in applications such as multipoint communication networks, it is desired to have synchronization and equalization without using a training sequence.

In fast fading channels, training sequences can be a large overhead and may significantly reduce channel throughput. Therefore, blind equalization techniques with joint channel estimation and signal detection is often required. Various methods for blind equalization are known in the prior art, including methods using stochastic gradient algorithm and higher order signal statistics. However, a primary drawback of those methods is the slow convergence of channel estimation, often requiring 10000–50000 symbols before an acceptable channel estimate is obtained.

Maximum Likelihood Sequence Estimation

A widely used blind equalization method is based on maximum likelihood sequence estimation (MLSE). For a simplified discrete-time finite channel model $h(k)$, $k=0, 1, \ldots, L$, given the transmitted symbols $x(n)$, $n=1, 2, \ldots, N$, the received sequence $y(n)$, $n=1, 2, \ldots, N$ can be expressed as:

$$y(n) = \sum_{k=0}^{L} h(k)x(n-k) + v(n), \quad (1)$$

where the variable $v(n)$ is an independent and identically distributed (i.i.d.) additive Gaussian noise with zero mean and variance $\sigma^2$. For a block of N received symbols, the probability density function of the received sequence $y(n)$, conditioned on knowing the channel model $h(n)$ and transmitted symbols $x(n)$ is:

$$p(y \mid h, x) = \frac{1}{(2\pi\sigma^2)^N} \exp\left(-\frac{1}{2\sigma^2} \sum_{n=1}^{N} \left| y_n - \sum_{k=0}^{L} h_k x_{n-k} \right|^2 \right). \quad (2)$$

The blind equalization essentially estimates the channel impulse response h and the transmitted data x only from a set of observations y. Equivalently, the solution minimizes the following cost function over h and x, $$J(h, x) = \sum_{n=1}^{N} \left| y_n - \sum_{k=0}^{L} h_k x_{n-k} \right|^2 = \|y - Ah\|^2, \quad (3)$$

where A is $$A = \begin{bmatrix} x_1 & 0 & \ldots & 0 \\ x_2 & x_1 & \ldots & 0 \\ \ldots & \ldots & \ldots & \ldots \\ x_N & x_{N-1} & \ldots & x_{N-L} \end{bmatrix}. \quad (4)$$

When the input signal is known by minimizing equation (3), the maximum likelihood channel estimation can be obtained by:

$$h_{ML}(x) = (A^t A)^{-1} A^t y. \quad (5)$$

On the other hand, when the channel impulse response is known, the maximum likelihood sequence of the source symbols can be obtained using the Viterbi algorithm. When neither h and x are known, a direct approach is to determine the maximum likelihood estimate of the channel impulse response h for each possible data sequence x. Then, the data sequence that minimizes the cost function $J(h,x)$ for each corresponding channel estimate is selected. Obviously, this exhaustive search approach has a large computational complexity that makes it impossible to use in practice when the number of symbols received increases.

The typical maximum likelihood based joint channel estimation and signal detection method generally includes initial channel estimation, followed by alternative signal detection and channel update steps.

Typical prior art methods operate alternately between parameter estimation, assuming that the symbols are known, and a Viterbi sequence detection, assuming that the channel parameters are known. One potential drawback of those methods is that they are very sensitive to the initial guess of the channel parameters, e.g., see Kaleh et al., "*Joint parameter estimation and symbol detection for linear or nonlinear unknown channels,*" IEEE Trans. on Communications, Vol. 42, No. 7, PP. 2406–2413, July, 1994, and Feder et al., "*Algorithms for joint channel estimation and data recovery—application to equalization in underwater communications,*" IEEE Journal of Oceanic Engineering, Vol. 16, No. 1, PP. 42–55, January, 1991.

Quantized channel estimation methods can also be used. Those methods are generally less sensitive to the initial channel estimate, e.g., see Zervas et al., "*A quantized* channel approach to blind equalization," Proc. IEEE ICC'92, Vol. 3, pp. 1539–1543, 1992. While that method has its advantage in a parallel structure and robustness to the initial estimate of the channel parameters, its complexity increases exponentially with the order of the channel due to operating multiple Viterbi algorithms simultaneously.

Another prior art method for joint blind channel estimation uses parallel adaptive general Viterbi algorithm to determine multiple estimated channels for symbol detection, see Seshadri et al., "*List Viterbi decoding algorithms with applications,*" IEEE Trans. on Communications, Vol. 42, No. 2/3/4, pp. 313–323, February, 1994, and Seshadri "*Joint data and channel estimation using blind trellis search techniques,*" IEEE Trans. on Communications, Vol. 42, No. 2/3/4, pp. 1000–1011, 1994, and U.S. Pat. No. 5,263,033 "*Joint data and channel estimation using fast blind trellis search,*" issued to Seshardi on Nov. 16, 1993. Because multiple channel estimates are maintained concurrently during each time instant, this method requires more computational resources than the conventional Viterbi algorithm. More important, that method does not guarantee the best convergence performance even though it can quickly achieve a rough channel estimate. That is because when channel estimation converges, noise may cause the method to select randomly from different channel estimates at each step. The channel estimates are updated immediately after path metrics are determined. Therefore, a single high noise value can diverge the direction of channel update and result in a non-optimal channel estimate. In addition, the number of trellis mappings derived by Seshadri is $$N_{tre}=2^L(2^{L+1}-2)(2^{L+1}-4)\ldots(4)(2)(1)=2^{2^L}(2^L)^{!}/2.$$

That value is much higher than the minimal number of trellis mappings desired for effective channel estimation.

To summarize, the less complicated methods of the prior art channel estimation and symbol detection are sensitive to the initial channel estimate, while robust initial estimates are very computationally complex.

SUMMARY OF THE INVENTION

The invention provides a two-mode trellis based maximum likelihood (ML) method and apparatus for blind joint channel estimation and signal detection. During a first mode, multiple channels are estimated and symbols detected through the estimated multiple channels are used to update the estimates. As the symbols are detected, path metrics for each of the multiple channels and channel variations are monitored. While the minimum path metric of the multiple channels and the corresponding channel variations do not satisfy predetermined constraints, the process repeats. Otherwise, a best channel of the multiple channels is identified.

When the best channel is identified, the method switches to a second mode where symbols are detected on the best channel as long as the minimum path metric of the best channel, or the rate of change of this minimum path metric remains below a predetermined threshold. If the minimum path metric of the best channel exceeds the threshold, the process switches back to the first mode of operation to find a new channel estimate.

More particularly, the invention provides method and system for performing blind joint channel estimation and signal detection in a communication system that includes multiple channels for transmitting symbols.

The multiple channels are estimated using a small number of symbols initially received through the multiple channels.

When the channels have been estimated, a single best channel is selected. From then on, the bulk of the symbols are detected only on the best channel, while the best channel is updated.

BRIEF DESCRIPTION OF THE DRAWINGS

FIG. 2a is a top-level block diagram of a method and apparatus for blind channel estimation and signal detection according to the invention; and FIG. 2b is a detailed block diagram of the method and apparatus for blind channel estimation and signal detection as shown in FIG. 2a;

DETAILED DESCRIPTION OF THE PREFERRED EMBODIMENT

Blind Channel Estimation and Signal Recovery

Figure 1:
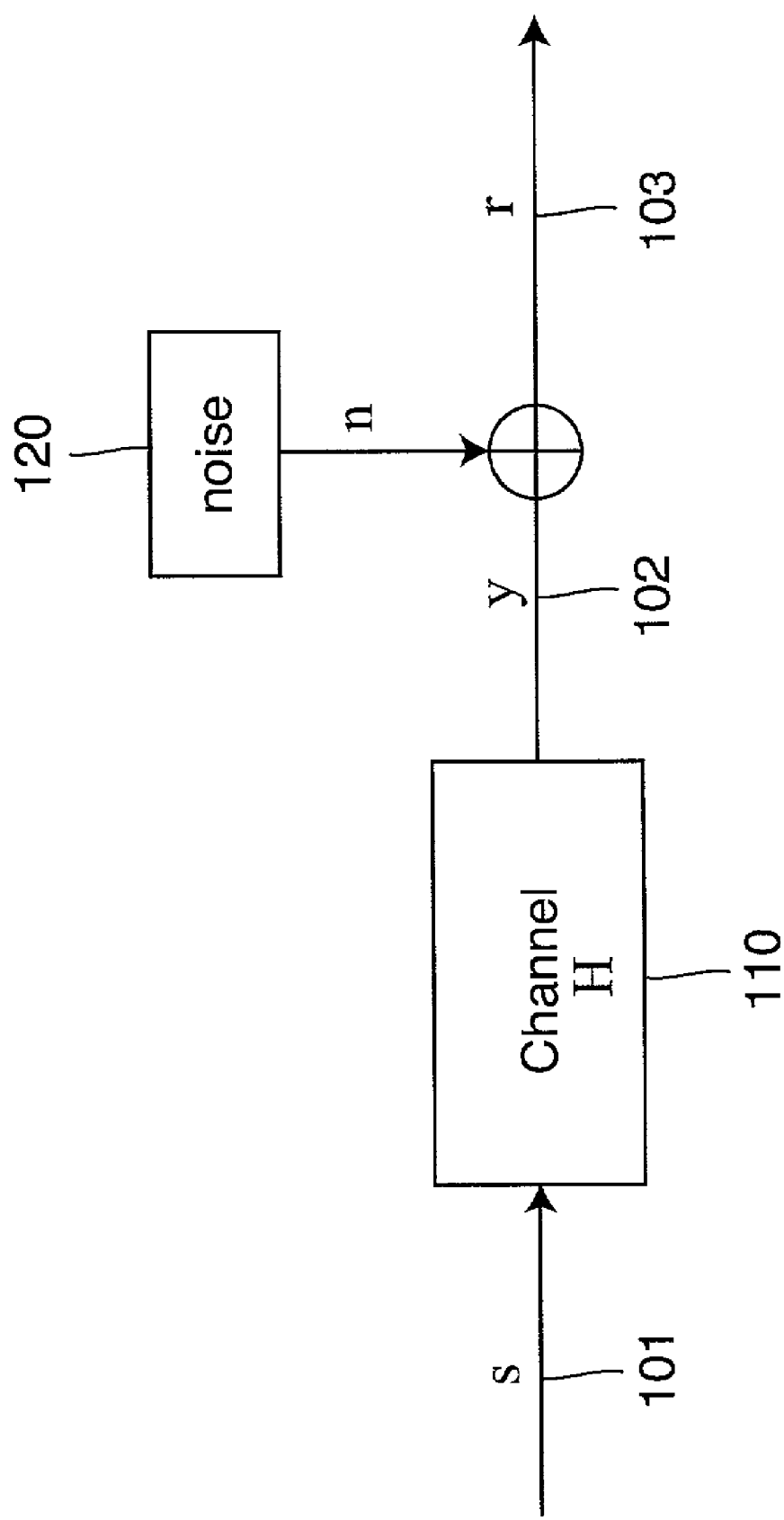
FIG. 1 is a block diagram of a blind channel to be estimated by the present invention.

FIG. 1 is a model of the "blind" channel problem solved by the invention. A source signal s 101 is transmitted through a channel H 110 subject to the above conditions. This results in an unknown signal y 102 having time and frequency dispersion. Additive noise n 120 further complicates the problem, leading to a received signal r 103. In classic channel estimation, both the input and output signals are usually known. However, in blind channel estimation, only the received signal r 103 is available, and therefore, the effects of the channel H 110 and noise n 120 can only be blindly estimated.

System Structure

Figure 2:
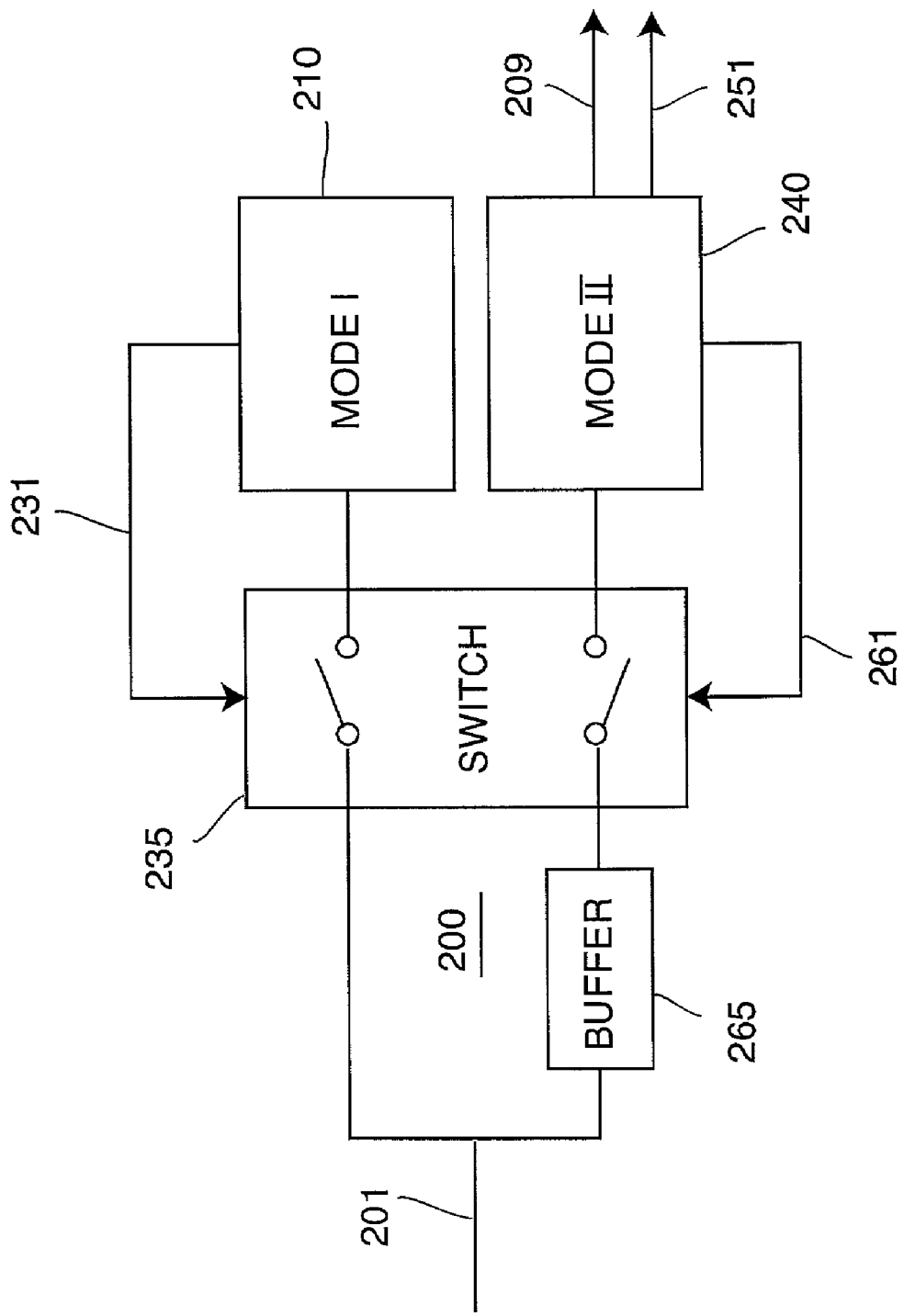

FIG. 2a shows a system 200 for blind joint channel estimating and signal detecting according to the invention. The system 200 includes a channel estimator and selector 210 and a symbol processor 240. The input to the system 200 is a received signal 201 and the outputs are a sequence of detected symbols 209 and the estimated channel response 251. A switch 235 connects the input signal 201 either to the channel estimator and selector 210 during a first mode of operation, or the symbol processor 240 during a second mode of operation. The system 200 can also include a buffer 265 for storing delayed input for the symbol processor 240 while the channel estimator and selector 210 is operating.

Figure 2B:
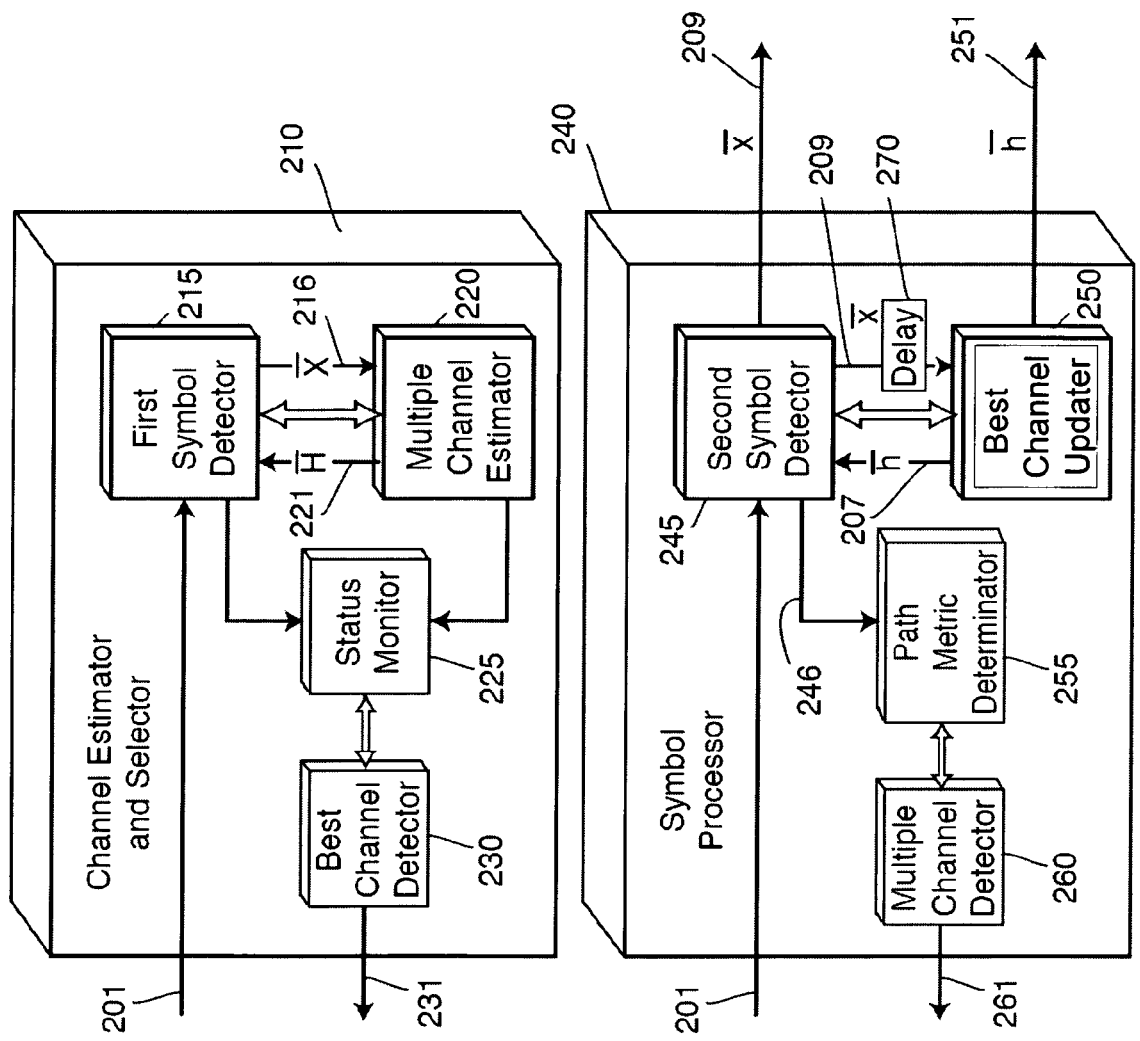

FIG. 2b shows details of the channel estimator and selector 210 including a first symbol detector 215 connected to a trellis-based multiple-channel estimator 220, as well as a status monitor 225 that receives output from the first symbol detector and the multiple a channel estimator. The status monitor 225 provides output to a best channel selector 230.

The symbol processor 240 includes a second symbol detector 245 connected to a trellis-based best channel updater 250 with a delay 270, a minimum path metric determiner 255, and a multiple channel selector 260.

System Operation

The system 200 according to the invention has two modes of operation. During the first mode, the channel estimator and selector 210 determines a best channel 231 based on the minimum path metrics and the channel variations measured in a Viterbi trellis with updating multiple estimated channels for the input signal 201.

During the second mode, the symbol processor 240 detects symbols received through the best channel and determines when to switch back to the first mode based on the minimum path metric of a Viterbi trellis using maximum likelihood techniques applied to the best channel using signal 261.

Operation of the method 200 for blind joint channel estimating and signal detecting begins in the first mode where the switch 235 directs the input signal 201 to the channel estimator and selector 210. The first symbol detector 215 receives the input signal and estimates symbols $\vec{x}$ 216 traveling through multiple channels. An initial "rough" estimate of the channel impulse is used to detect the first estimated symbol.

Thereafter, the multiple channel estimator 220 uses the output symbols $\vec{x}$ 216 of first symbol detector 215 to further estimate the impulse response $\vec{H}$ 221 of the multiple channels. The status monitor 225 uses the output from the first symbol detector and the multiple channel estimator to monitor a path metric of each of the multiple estimated channels and channel variations. A best channel selector 230 selects the estimated channel 231 among the multiple estimated channels that has the minimum path metric and a channel evolution which satisfies a linear constraint, described in greater detail below.

When the best channel 231 is selected, the switch 235 directs the input signal 201 to the symbol processor 240. The second symbol detector 245 only detects symbols 209 traveling through the best channel. The second symbol processor 245 output is a sequence of detected symbols x 209. Further, a best channel updater 250 uses the delayed output 270 of the second symbol detector to further update the impulse response $\vec{h}$ 207 of best channel. The best channel updater output 207 is used in the second symbol detector to detect symbols 201.

A path metric determiner 255 uses the output of either the second symbol detector or the best channel estimator to determine a minimum path metric of the best channel. If the path metric of the best channel is larger than a predetermined threshold, then the multiple channel selector 260 causes the switch 235 to direct the input signal 201 to the channel estimator and selector 210 with signal 261 so that a next best channel can be selected.

During the first mode of operation, we use parallel list Viterbi algorithm to concurrently maintain multiple channel estimates. Then, we select the channel with the minimum path metric and correct evolution as the best channel. Either a least mean square (LMS) or a recursive least square (RLS) can be used to update channel estimates after symbols are detected. Only a small number of received symbols are required for this task, for example, less than fifty for channel lengths up to five. The linear constraint of trellis mapping is exploited to monitor the evolution of the channel estimates and the path metrics to determine when the best channel has been estimated. When the best channel is selected, the second operational mode uses adaptive Viterbi algorithm on the best channel only to update or track the best channel estimate and detect the symbols.

First Multi-Channel Mode of Operation

Figure 3:
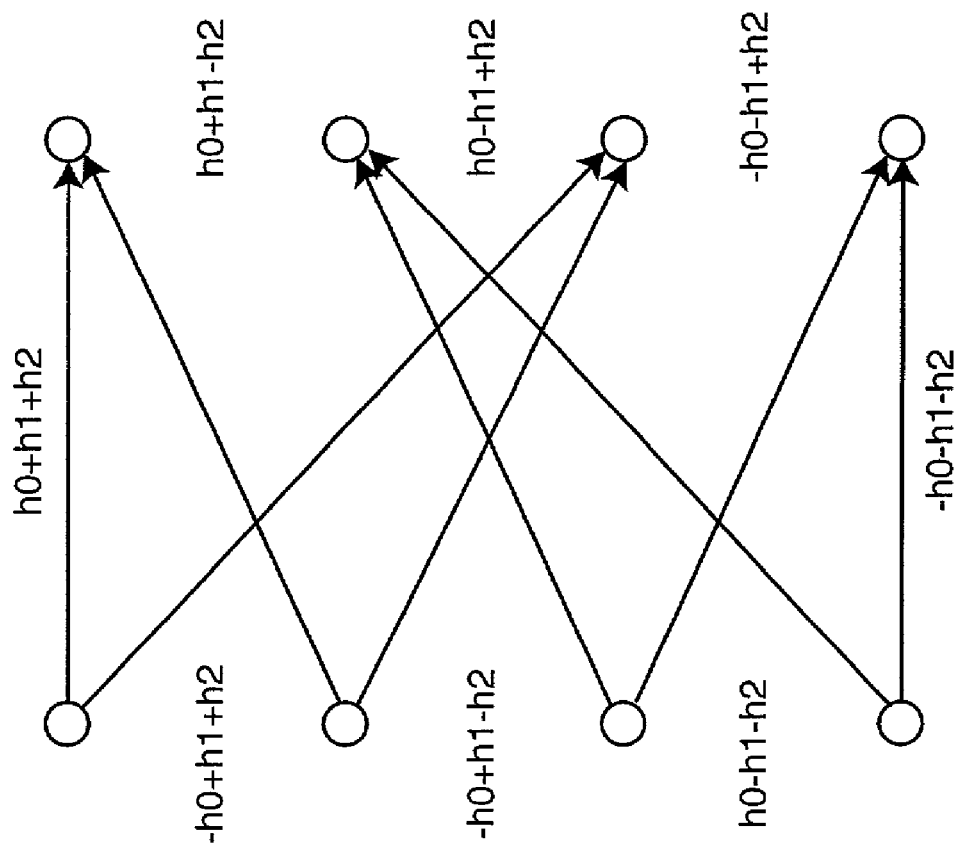
FIG. 3 is a representation of a trellis structure according to the invention.

FIG. 3 models the trellis used by the multiple channel estimator 220 according to the invention. For a binary signal (M=2) and a channel impulse response L+1, a trellis structure 300 is defined. FIG. 3 is an example for L=2. The task is to correctly map the received symbols to appropriate trellis branches.

The number of the mappings is expressed by:

$$N_{trellis} = 2^L(2^{L+1}-2)(2^{L+1}-4)\ldots(2^{L+1}-2L), \quad (6)$$

where the number of terms in the above product is L+1. In the absence of additive noise, the received channel symbols are $$\{c_1, c_2, \ldots, c_2^L, -c_2^L, \ldots, -c_2, -c_1\}.$$

Equation (6) is interpreted as follows. The symbol $c_1$ can be mapped to one of $2^L$ branches when differential encoding is adopted. Then, the symbol $-c_1$ is fixed automatically due to the symmetry of the trellis branch. Therefore, symbol $c_2$ can be mapped to one of the following $2^{L+1}-2$ branches. Similarly, symbol $c_3$ is mapped to one of $2^{L+1}-4$ branches, etc. However, as long as symbol $c_{L+1}$ is mapped, we are able to select L+1 branches from the totally allocated 2(L+1) branches to set up L+1 linear equations. From these linear equations, the L+1 components of the channel impulse response are determined completely. Consequently, the rest of symbols $\{c_{L+2}, \ldots, c_2^L\}$ and $\{-c_{L+2}, \ldots, -c_2^L\}$ are automatically mapped to their corresponding branches according to the channel impulse response h. This property is the linear constraint, mention above, for mapping symbols to trellis branches according to the invention.

Notice that the linear constraint according to the invention has not been considered in the prior art. Also, the number of trellis mappings is much lower in our invention than in the prior art. While it is impossible to consider all of the trellis mappings to find the best one, we concurrently consider multiple "most-appropriate" mappings. This can be realized by incorporating the parallel list Viterbi algorithm with an LMS or RLS adaptive method. Limited by the linear constraint, the actual length of symbol sequence to get a good channel estimate is quite short. By employing parallel adaptive list Viterbi algorithm, fast convergence generally occurs in the first 30–50 symbols, when L≦4.

Second Single Channel Mode of Operation

After the best channel is determined, it is unnecessary to continue using the parallel adaptive list Viterbi algorithm. At this point, it is reasonable to switch to the second mode of operation. While in this mode, either LMS or RLS processes can be used to further update the best channel.

In our system 200, the adaptive Viterbi algorithm is used to accomplish this task. A delay, equal to a small number of symbols, e.g., ten, is put between the symbol detection and further channel update. The delay reduces isolated high value noise that can diverge the updating of the best channel.

We can use a buffer 265 to store input symbols while the best channel is estimated during the first mode. These stored symbols can then be detected during the second mode of operation.

In the second mode of operation, the invention performs symbol detection and channel update in only one pass of the trellis. This eliminates the long delay associated with the iterative prior art methods. The invention has better MSE convergence compared to continuous use of parallel adaptive list Viterbi algorithm with zero delay in updating channels, as in the prior art. The MSE of channel estimation can be expressed as:

$$MSE(t) = \frac{1}{I}\sum_{i=1}^{I}\sum_{k=0}^{L}\left[h_{est}^{i}(k)^{(t)} - h(k)\right]^{2}, \quad (7)$$

where t is a time stage along the trellis processing. The variable I is the number of data blocks tested to obtain the average MSE value, the value h(k) is the original channel response, and $h_{est}^{i}(k)^{(t)}$ is the estimated channel response at time instant t for the $i^{th}$ block.

Switch Between Above Two Operation Modes

The linear constraint for the mapping of channel symbols to trellis branches not only guarantees a best channel selection after a small number of received symbols, but also provides the technique to switch between these two operation modes as well.

As shown in FIG. 3, in the absence of channel noise, we have eight different channel symbols $\{(c_1, -c_1), (c_2, -c_2), (c_3, -c_3), (c_4, -c_4)\}$, given a starting state, when four different symbols from above four different sets are received. The trellis mapping is completely fixed by receiving of the next symbol. Therefore, the length of the received sequence that is sufficient to determine the channel response can be as short as five symbols, in this example. These same characteristics can be adopted to monitor whether a best channel is obtained, or not.

We can check the path going through the states of the trellis with minimum path metrics at different stages. If the linear constraint is satisfied in a number of consecutive stages, then a high confidence of determining the best channel is ensured. This linear constraint also indicates whether one channel is in correct evolution. That is, whether the channel is updated from a previous version of its own, or from a previous version of another channel. In short, channel variations and the minimum path metrics can be exploited to determine when to switch from the first mode of operation to the second mode of operation.

In the second mode, the minimum path metric of the best channel update along the trellis is monitored. The value of the minimum path metric always increases, but the rate of increase and the absolute value of the minimum path metric are determined by the distance between detected symbols and original transmitted symbols. Therefore, if the rate of increase or value of the minimum path metric is larger than a predetermined threshold, then the current estimated channel response is diverging from the true channel response. In this case, the multi-channel selector 260 asserts a signal on line 261 to switch back to the first mode of operation and select another best channel.

Effect of the Invention

The invention of trellis based maximum likelihood signal estimation and blind joint channel estimation and signal detection has the following effects. First, the method is stable to initial channel estimation because multiple channels are concurrently estimated during the first mode. Second, our method has reduced computational complexity during the second mode of operation, when only a single channel estimate is maintained in the trellis progress. Third, the bulk of the symbols are processed in only a single pass, except for a very small number of symbols used to estimate the best channel in the first mode of operation. This eliminates the long delay that is inherent in many prior art methods. Finally, the invention can achieve a high convergence performance for channel estimation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for blind joint channel estimation and signal detection in a communication system including a plurality of channels for transmitting symbols, comprising:
   means for estimating the plurality of channels using symbols received from the plurality of channels, the means for estimating including a best channel selector connected to an output of a status monitor;
   means for selecting a best channel from the estimated plurality of channels;
   means for detecting symbols received only on the best channel while updating only the best channel, the means for detecting including a multiple channel selector connected to an output of a minimum path metric determiner; and
   a switch connected to the best channel selector and the multiple channel selector, the switch configured to connect an input signal including the symbols to the means for estimating the plurality of channels and the means for detecting symbols received only on the best channel.

2. The apparatus of claim 1 wherein the means for estimating the plurality of channels further comprises:
   a first symbol detector;
   a trellis-based multiple-channel estimator connected to the first symbol detector;
   a status monitor connected to outputs of the first symbol detector and the trellis-based multiple-channel estimator; and
   a best channel selector connected to an output of the status monitor.

3. The apparatus of claim 1 wherein the means for detecting symbols further comprises:
   a second symbol detector;
   a trellis-based best channel updater connected to the second symbol detector via a delay;
   a minimum path metric determiner connected to an output of the second symbol detector; and
   a multiple channel selector connected to an output of the minimum path metric determiner.

4. The apparatus of claim 1 further comprising:
   a buffer for storing the symbols before the symbols are processed by the means for detecting symbols received only on the best channel.

5. The apparatus of claim 1 wherein the means for estimating the plurality of channels and the means for selecting the best channel determine the best channel based on minimum path metrics and channel variations measured in a Viterbi trellis with updating the plurality of estimated channels according to estimated symbols.

6. The apparatus of claim 1 wherein the means for detecting symbols detects symbols received through the best channel and determines when to switch the input signal to the means for estimating the plurality of channels based on a minimum path metric of a Viterbi trellis using maximum likelihood techniques applied to the best channel.

7. The apparatus of claim 1 wherein the means for estimating the plurality of channels uses parallel list Viterbi algorithm to concurrently maintain multiple estimates of the plurality of channels and the best channel selected has a minimum path metric and correct evolution.

8. The apparatus of claim 7 wherein the multiple estimates are updated using a least mean square process.

9. The apparatus of claim 7 wherein the multiple estimates are updated using a recursive least square process.

10. The apparatus of claim 1 wherein the received symbols are mapped to a Viterbi trellis according to a linear constraint expressed by:

$$N_{trellis}=2^L(2^{L+1}-2)(2^{L+1}-4)\ldots(2^{L+1}-2L), \quad (6)$$

where $N_{trellis}$ is the number of mappings, the number of terms is L+1, and the received channel symbols are $\{C_1, C_2, \ldots, C_2^L, -C_2^L, \ldots, -C_2, -C_1\}$.

11. The apparatus of claim 10 wherein the best channel is selected before less than fifty symbols are received when L is less than four.

12. The apparatus of claim 1 wherein the symbols are detected while the best channel is updated in only one pass of a Viterbi trellis.

13. The apparatus of claim 1 wherein the best channel updating is delayed after detecting the symbols on the best channel.

14. The apparatus of claim 13 wherein the delay is less than ten symbols to reduce isolated high value noise that can diverge the updating of the best channel.

15. A method for blind joint channel estimation and signal detection in a communication system including a plurality of channels for transmitting symbols, comprising:

estimating the plurality of channels using symbols received from the plurality of channels;

maintaining, concurrently, multiple estimates of the plurality of channels using a parallel list Viterbi algorithm;

selecting a best channel from the estimated plurality of channels, the best channel having a minimum path metric and correct evolution; and detecting symbols received only on the best channel while updating the best channel in a single pass, wherein the updating is delayed after detecting the symbols on the best channel, the delay being less than ten symbols to reduce isolated high value noise that can diverge the updating of the best channel.

* * * * *